Oct. 14, 1952　　　　N. O. HOLMSTEN　　　　2,613,970
FASTENING DEVICE
Filed April 23, 1949　　　　　　　　　　　2 SHEETS—SHEET 1
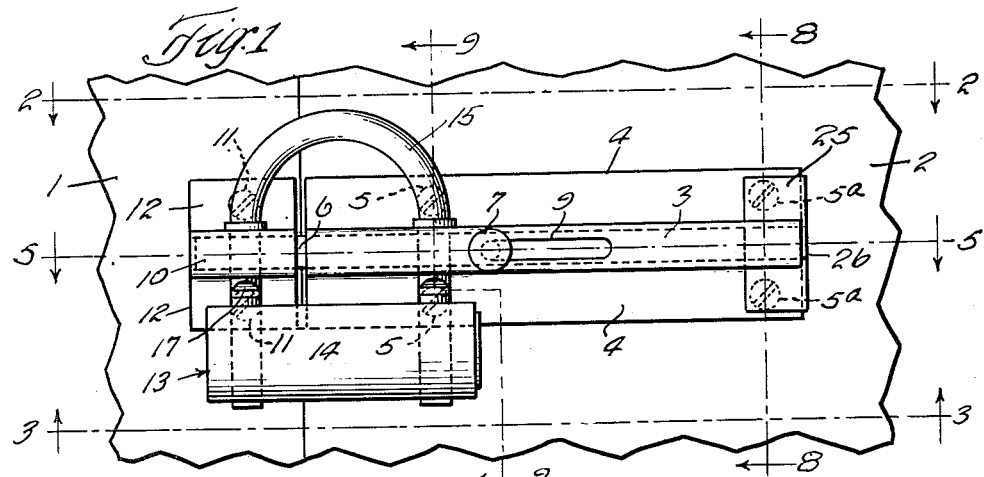
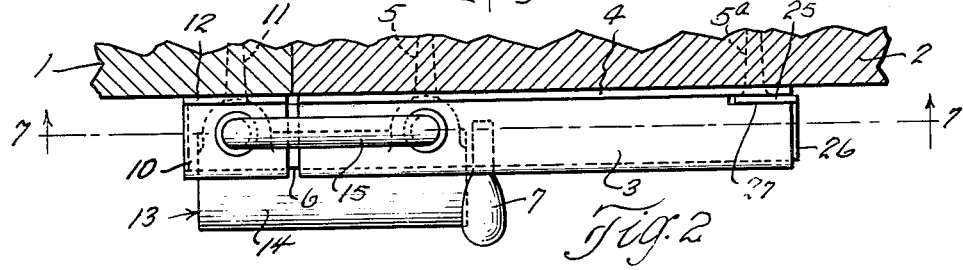
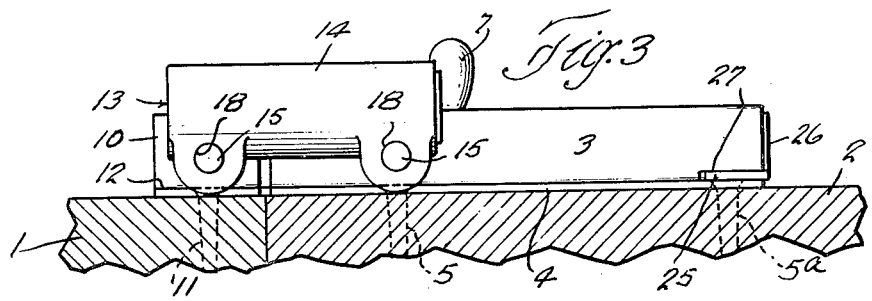
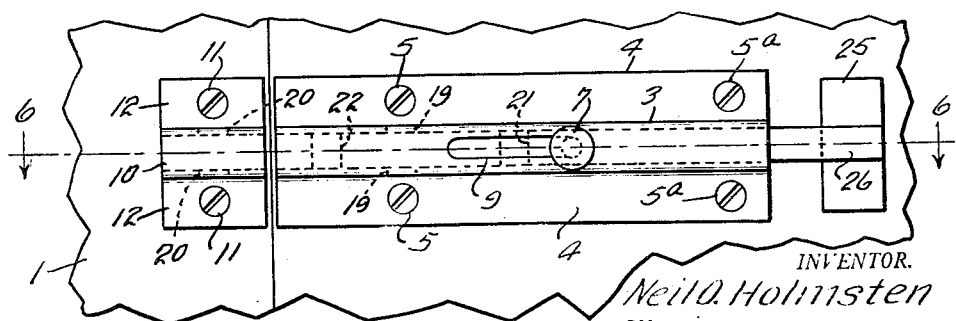
INVENTOR.
Neil O. Holmsten
BY
Atty.

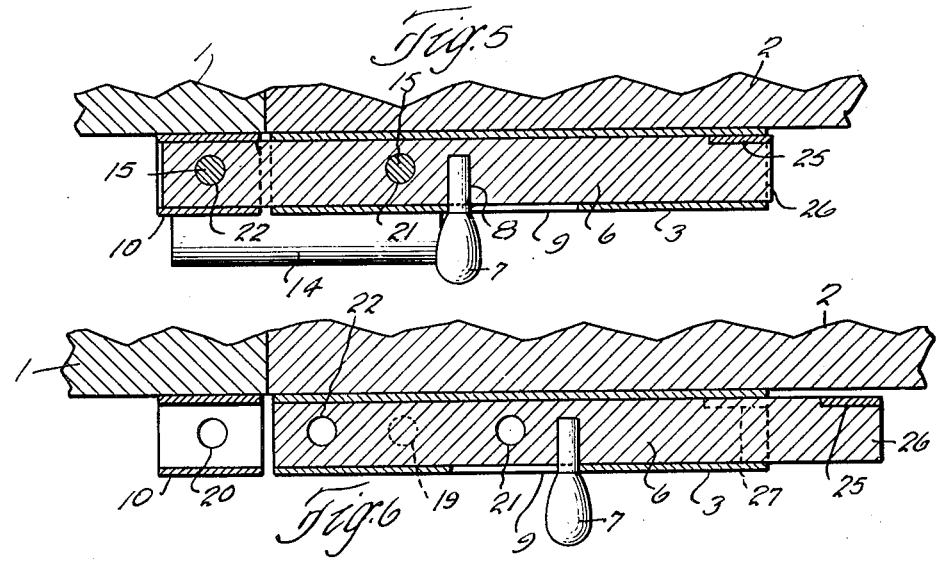
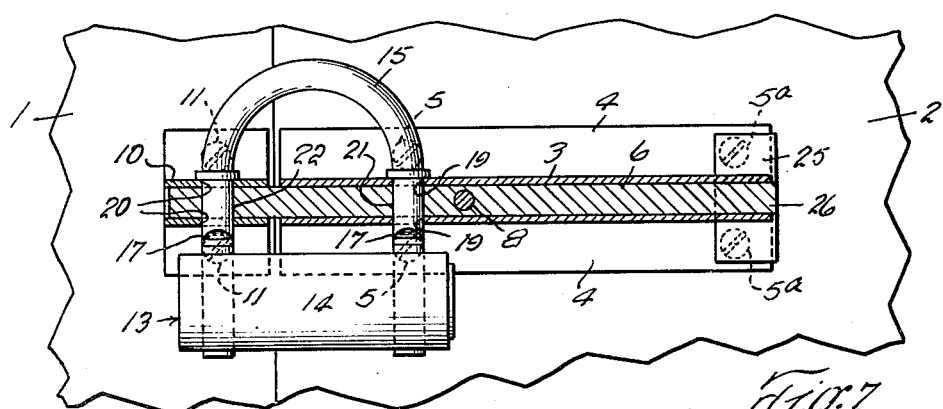
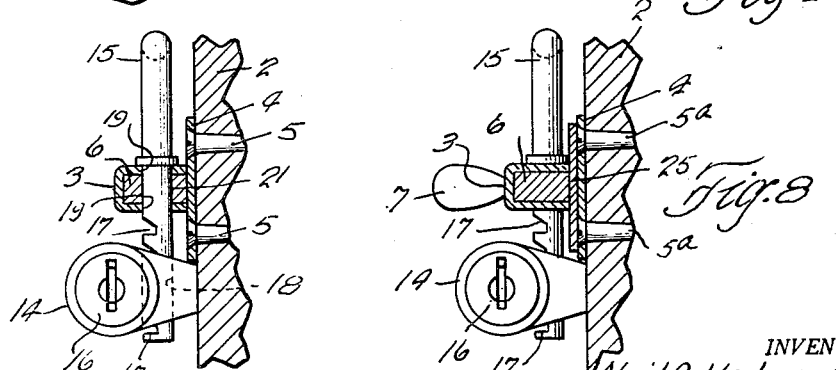

Patented Oct. 14, 1952

2,613,970

UNITED STATES PATENT OFFICE 2,613,970

FASTENING DEVICE

Neil O. Holmsten, New Rochelle, N. Y.

Application April 23, 1949, Serial No. 89,182

2 Claims. (Cl. 292—148)

This invention relates generally to fastening means for doors, windows, or the like, of the type in which a latching bolt carried by one of a pair of relatively movable members is adapted to engage a keeper carried by the other member. More specifically, the invention relates to a latching bolt fastening means having incorporated therewith locking means by which the unauthorized operation of the latching bolt is prevented.

An object of the invention is to provide a latching bolt fastening with locking means which is so constructed and arranged that the latching bolt cannot be released from the associated keeper by unauthorized persons even after the glass in a door, window, or the like, has been broken to afford access to the fastener.

Another object of the invention is to provide a latching bolt fastener with locking means which is so constructed and arranged as to constitute a guard which covers the attaching screws, when the fastener is in locked position, and thereby prevents access thereto so that the screws cannot be withdrawn and the fastening means removed.

Still another object of the invention is to provide a novel and improved fastening means of this type which is very efficient and is of simple construction and relatively inexpensive to manufacture.

Other and more limited objects of the invention will be apparent from the following specification and the accompanying drawings forming a part thereof wherein:

Fig. 1 is a front elevation showing a locking mechanism constructed according to my invention applied to a door with the parts in locking position;

Fig. 2 is a horizontal section taken on the line 2—2 of Fig. 1;

Fig. 3 is a horizontal section taken on the line 3—3 of Fig. 1;

Fig. 4 is a view similar to Fig. 1 showing the parts in unlocked position;

Fig. 5 is a horizontal section taken on the line 5—5 of Fig. 1;

Fig. 6 is a horizontal section taken on the line 6—6 of Fig. 4;

Fig. 7 is a vertical section taken on the line 7—7 of Fig. 2;

Fig. 8 is a vertical section taken on the line 8—8 of Fig. 1; and

Fig. 9 is a vertical section taken on the line 9—9 of Fig. 1.

The invention is designed to be incorporated in and used in conjunction with standard type latching mechanisms such as are used for holding doors, windows, and the like, closed. Latches of this type are generally applied to a window, door, or the like, on the inside thereof, and are quite effective for maintaining the door, window, or the like, closed, but it is relatively easy for an unauthorized person to release these latches, and open the door or window to which it is applied, to gain entrance to a building. It is only necessary to break a pane of glass close to the latch, or to remove a small section therefrom, or to cut a relatively small hole in the door, or the like, and then reach in and release the latch, after which the door or window may be opened. As previously stated, one of the principal objects of the invention is to incorporate in latches of this kind a locking mechanism which makes it impossible to release the latch even though access thereto may have been had, as above stated. The invention may be applied to latches of the sliding bolt type, or it may be applied to latches in which the bolt is rotated into and out of engagement with a keeper. These latching mechanisms generally comprise two parts, a latching bolt and a keeper which the latching bolt is adapted to engage. They are used in conjunction with a stationary member, such as a door or window frame, or the like, and a movable member which may be a door, window, or like movable member. The latching bolt is adapted to be applied to one of the members and the keeper is applied to the other member in position to be engaged by the latching bolt. Generally, the keeper is applied to the stationary member and the latching bolt is applied to the movable member. But, however, this order may be reversed and the keeper applied to the movable member and the latching bolt applied to the stationary member.

Referring now to the embodiment of the invention shown in the drawings by the reference characters, the numeral 1 indicates a stationary frame, wall, or the like, and the numeral 2 indicates a movable member, such as a door or a window. A guide 3, U-shape in cross-section and having attaching flanges 4, is secured to the movable member 2 by screws 5 and 5a which are inserted through apertures in the attaching flanges 4 and screwed into the member 2. A latching bolt 6 is slidably mounted in the guide 3 and is adapted to be moved back and forth therein by an operating handle 7 which is secured in a hole 8 in the latching bolt 6 and projects outwardly therefrom through an elongated slot 9 in the guide 3. A keeper 10, similar in cross-section to the guide 3, is secured to the stationary member 1 by screws 11 which are inserted through apertures in attaching flanges 12 which extend outwardly from the legs of the keeper 10. The keeper 10 is disposed in alignment with the latching bolt 6 which is adapted to be projected out from the guide 3 and into the keeper 10 by the operating handle 7. In order to prevent the unauthorized releasing of the latching bolt 6 from the keeper 10, I provide a locking mechanism generally indicated by the numeral 13. The locking mechanism 13 is of a standard type which is generally known as a "bicycle lock." It comprises a cylinder lock 14 and a shackle 15. A key-operated rotary plug 16, which is incorporated in the lock 14, is adapted to actuate mechanism which engages notches 17 formed in the legs of the shackle 15 when the shackle is disposed in the receiving apertures 18 in the lock 14. The guide 3 is provided with aligned apertures 19 in the legs thereof, and the keeper 10 is provided with aligned apertures 20 in the legs thereof. The latching bolt 6 is provided with a pair of spaced apertures 21 and 22 which are adapted to align with the apertures 19 and 20 respectively, when the latching bolt 6 is in latching position, in engagement with the keeper 10. In order to lock the bolt in latching position, the shackle 15 has one leg thereof inserted through the aligned apertures 19 and 21, and the other leg thereof inserted through the aligned apertures 20 and 22. The lock 14 is then pushed onto the shackle and locked thereon. It will be apparent therefore that even though access may be had to the latching mechanism it will be impossible to release it unless the locking mechanism 13 is first removed. In order to prevent the removal of the attaching screws 5 and 11 and thereby remove the latching mechanism from the members 1 and 2, I dispose the screws 5 and 11 directly behind the legs of the shackle 15, as is clearly shown in Figs. 1 and 7. In order to prevent the removal of the screws 5a from the attaching flanges 4, I secure a guard plate 25 to the end 26 of the latching bolt 6. When the latching bolt 6 is in latching position, as shown in Figs. 1 and 7, the guard plate 25 is disposed over the screws 5a. In order to accommodate the guard plate 25 in this position, the legs of the guide 3 are notched, as indicated at 27.

From the foregoing it will be seen that I have provided a very simple and efficient mechanism for accomplishing the objects of my invention.

It is to be understood that I am not restricted to the specific form shown and described herein, as various modifications may be made thereto within the spirit of the invention.

What is claimed is:

1. In a latching mechanism for securing a movable member against movement with respect to a stationary member, a combination of a guide having upper and lower flanges secured to one of said members by attaching screws, a latching bolt slidably supported by said guide, a keeper having upper and lower flanges secured to the other of said members by attaching screws, means for moving said latching bolt into and out of engagement with said keeper, apertures in said guide in vertical alignment with said attaching screws, an aperture in said keeper in vertical alignment with its attaching screws, a pair of spaced apertures in said latching bolt adapted to align respectively with the apertures in said guide and in said keeper when said latching bolt is in latching position, and restraining means operative to prevent movement of said latching bolt when said latching bolt is in latching position, said restraining means including a shackle having legs extending vertically through said aligned apertures and adapted to cover and prevent access to said attaching screws and a member engaging the free ends of said legs below said bolt and adapted to be locked thereto to prevent withdrawal of said shackle from said bolt.

2. In a latching mechanism for securing a movable member against movement with respect to a stationary member, the combination of a guide having upper and lower flanges secured to one of said members by attaching screws, a latching bolt slidably supported by said guide, a keeper having upper and lower flanges secured to the other of said members by attaching screws, means for moving said latching bolt into and out of engagement with said keeper, an aperture in said guide in vertical alignment with its attaching screws, an aperture in said keeper in vertical alignment with its attaching screws, a pair of spaced apertures in said latching bolt, one of said spaced apertures being adapted to align with the aperture in said guide and the other of said spaced apertures being adapted to align with the aperture in said keeper when said latching bolt is in latching position, restraining means operative to prevent movement of said latching bolt when said latching bolt is in latching position, said restraining means including legs extending vertically through said aligned apertures and adapted to cover and prevent access to said attaching screws, a member engaging the free ends of said legs below said bolt and adapted to be locked thereto to prevent withdrawal of said legs from said bolt.

NEIL O. HOLMSTEN.

REFERENCES CITED

The following references are of record in the file of this patent:

UNITED STATES PATENTS

| Number | Name | Date |
| --- | --- | --- |
| 257,141 | Purves | Apr. 25, 1882 |
| 305,294 | Corn | Sept. 16, 1884 |
| 1,047,315 | Shone | Dec. 17, 1912 |
| 1,364,757 | Herrman | Jan. 4, 1921 |
| 1,368,711 | Foley | Feb. 15, 1921 |
| 2,198,079 | Ferris et al. | Apr. 23, 1940 |
| 2,475,478 | Clair | July 5, 1949 |
| 2,482,341 | Holmsten | Sept. 20, 1949 |